US008920227B2

United States Patent
Murray et al.

(10) Patent No.: US 8,920,227 B2
(45) Date of Patent: Dec. 30, 2014

(54) SPRING LOADED COUNTER KNIFE BANK ASSEMBLY

(71) Applicant: CNH America LLC, New Holland, PA (US)

(72) Inventors: Craig Elwyn Murray, Davenport, IA (US); Nicholas Stephen Shane, Davenport, IA (US)

(73) Assignee: CNH Industrial America LLC, New Holland, PA (US)

(*) Notice: Subject to any disclaimer, the term of this patent is extended or adjusted under 35 U.S.C. 154(b) by 92 days.

(21) Appl. No.: 13/732,788

(22) Filed: Jan. 2, 2013

(65) Prior Publication Data

US 2014/0187298 A1 Jul. 3, 2014

(51) Int. Cl.
*A01F 12/40* (2006.01)
*A01D 75/18* (2006.01)
*A01F 29/09* (2010.01)
*A01F 29/04* (2006.01)

(52) U.S. Cl.
CPC .............. *A01F 29/095* (2013.01); *A01F 29/04* (2013.01); *A01D 75/182* (2013.01)
USPC ......................................... 460/112

(58) Field of Classification Search
USPC ........... 460/66, 69, 73, 80, 83, 112, 113, 119, 460/59
See application file for complete search history.

(56) References Cited

U.S. PATENT DOCUMENTS

| 3,005,637 | A |   | 10/1961 | Hetteen |
|-----------|---|---|---------|---------|
| 5,769,711 | A | * | 6/1998  | Roberg ........................ 460/73 |
| 5,833,533 | A |   | 11/1998 | Roberg |
| 5,913,724 | A | * | 6/1999  | Roberg ........................ 460/83 |
| 5,928,079 | A | * | 7/1999  | Roberg ........................ 460/83 |
| 5,974,776 | A |   | 11/1999 | Prellwitz |
| 6,128,995 | A |   | 10/2000 | Geng |
| 6,152,820 | A |   | 11/2000 | Heidjann et al. |
| 6,912,835 | B1 |  | 7/2005  | Chabassier |
| 7,484,350 | B2 |  | 2/2009  | Benes et al. |
| 8,006,926 | B2 |  | 8/2011  | Benes et al. |
| 8,141,805 | B1 |  | 3/2012  | Isaac et al. |

FOREIGN PATENT DOCUMENTS

GB        1524511        9/1978

* cited by examiner

*Primary Examiner* — Robert Pezzuto
(74) *Attorney, Agent, or Firm* — Seyed V. Sharifi T.; Patrick M. Sheldrake

(57) ABSTRACT

A counter knife bank assembly of a chopper assembly for an agricultural combine is provided that can pass obstructions without damaging the knife blades of the knife blade assembly. The counter knife bank assembly includes a knife bank and a lever assembly connected to the knife bank. The knife bank is moveable between a first position and a second position relative to a stationary frame of the chopper assembly. The lever assembly includes an extension member having a first end connected to the knife bank, a biasing member connected to the extension member, and an abutment member. The abutment member is engaged with the biasing member and is biased against a stationary support member of the counter knife bank assembly for articulation therewith.

22 Claims, 11 Drawing Sheets

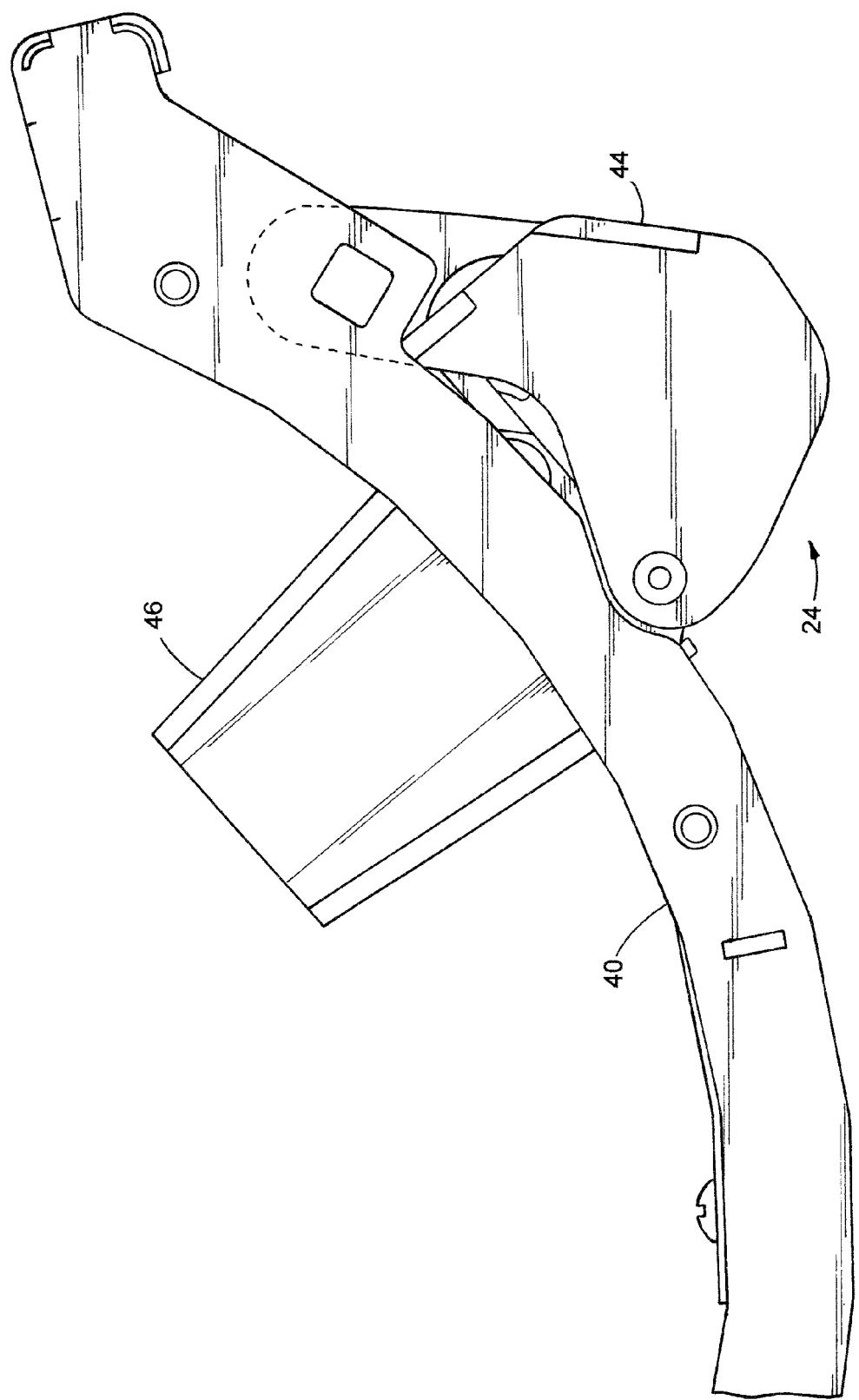

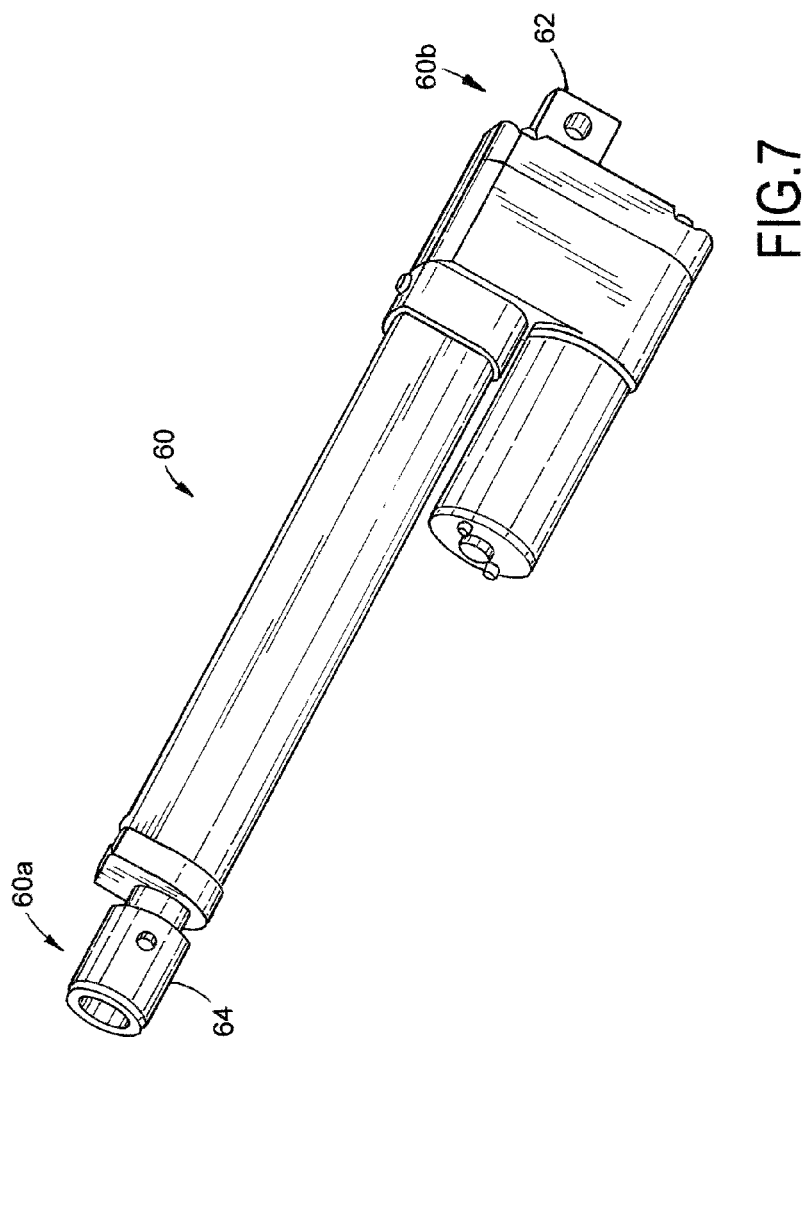

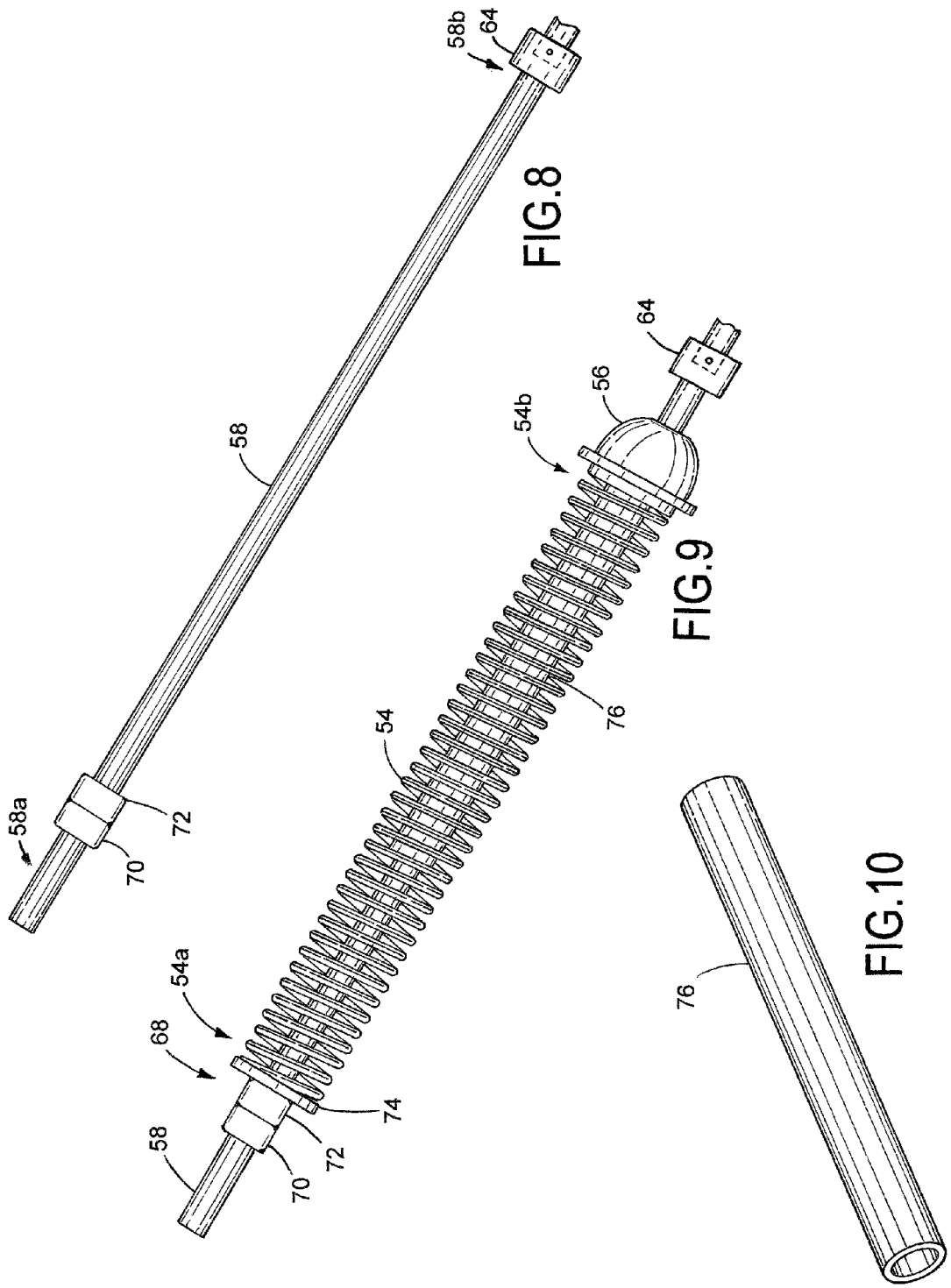

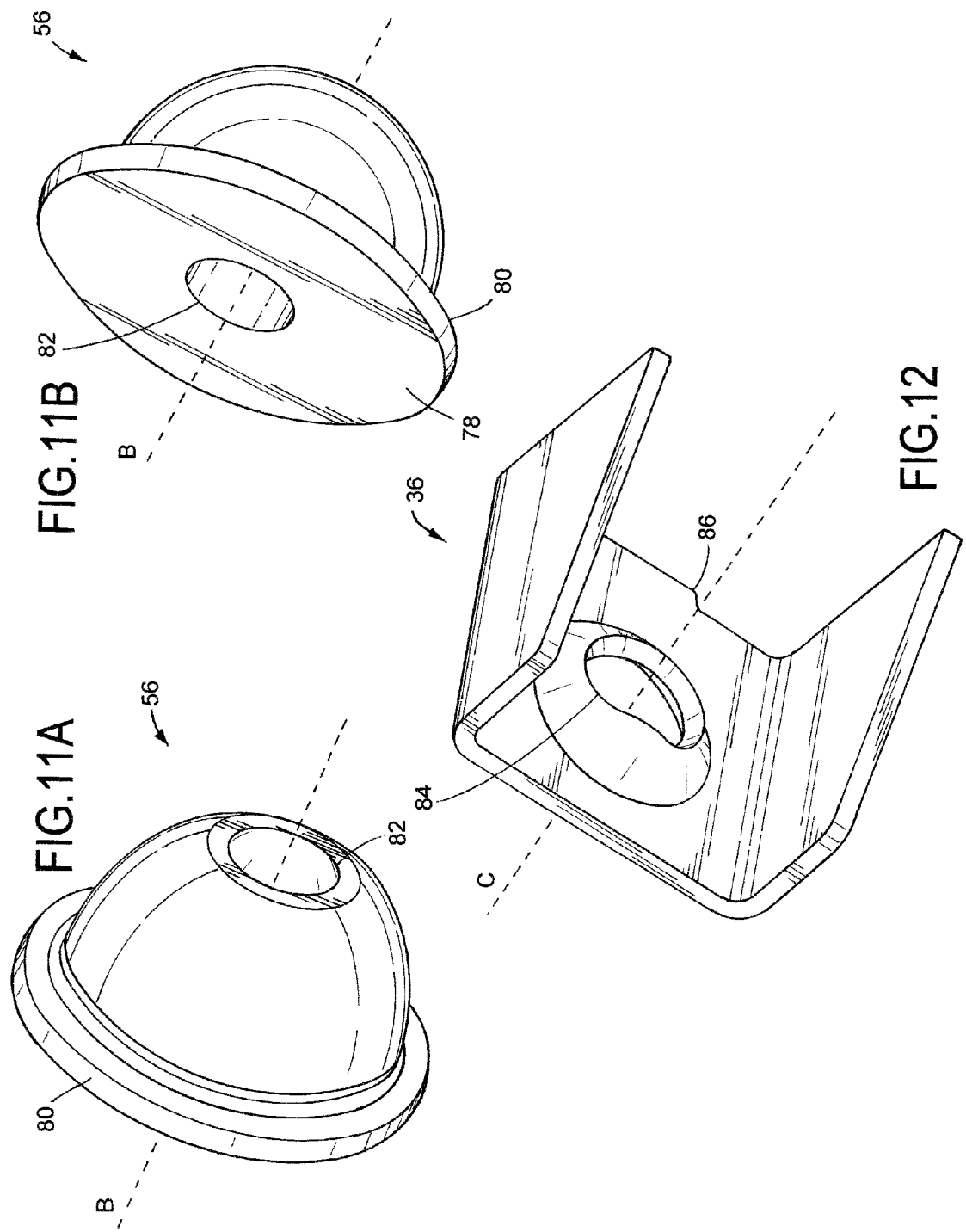

SPRING LOADED COUNTER KNIFE BANK ASSEMBLY

BACKGROUND OF THE INVENTION

The present invention relates generally to agricultural machinery and more particularly to improvements to a counter knife bank assembly of a chopper assembly for an agricultural combine.

Chopper assemblies of the general type herein disclosed usually include a set of "fixed" cutting elements or a knife bank, and a plurality of rotatable cutter bars, which pass between the fixed cutting elements and cooperate therewith to disintegrate the straw or other agricultural material delivered into the chopper assembly. However, when the chopper assembly is used in conjunction with a combine, the chopper may frequently be subject to extremely heavy loads as, for example, an auger bit, a rock or any other object of strength that can cause damage to the fixed cutting elements. Current fixed blade choppers do not have a mechanism for relieving pressure to pass these obstructions. Additionally, conventional chopper assemblies do not allow the knife bank to reengage without manual and physical intervention by an operator.

Thus, there is still a need for a counter knife bank assembly of a chopper assembly that is capable of passing obstructions that can cause damage to the knife blades of the knife bank assembly while still maintaining the proper pressure required so as to be able to chop harvested crop material. Additionally, there is a need for a counter knife bank assembly that can be reengaged after it has been disengaged by the above mentioned obstruction without the operator having to manually and physically reengage the knife bank so as to improve efficiency of operation. Such a need is satisfied by the counter knife bank assembly of the present invention.

BRIEF SUMMARY OF THE INVENTION

In a first aspect, the present invention provides a counter knife bank assembly of a chopper assembly that includes a knife bank and a lever assembly. The knife bank is connected to a frame of the chopper assembly and moveable between a first position and a second position relative to the frame. The lever assembly is connected to the knife bank for moving the knife bank between first and second positions. The lever assembly includes an extension member having a first end operatively connected to the knife bank, a biasing member connected to the extension member, and an abutment member engaged with the biasing member and biased against a stationary support member of the chopper assembly for articulation therewith.

In an alternative aspect, the present invention provides a chopper assembly for an agricultural combine including a rotary chopper element and a counter knife bank assembly. The counter knife bank assembly is spaced from the rotary chopper element forming a passageway therethrough. The counter knife bank assembly includes a knife bank and a lever assembly. The knife bank is connected to a frame of the chopper assembly and moveable between an engaged position and a retracted position relative to the rotary chopper element. The lever assembly is connected to the knife bank for moving the knife bank between engaged and retracted positions and includes an actuator, an extension and a biasing member. The actuator has a proximal end connected to the knife bank and a distal end opposite the proximal end. The extension extends from the distal end of the actuator. The biasing member has a first end and a second end opposite the first end. The first end is fixedly attached to the extension and the biasing member provides a biasing force on the knife bank and the actuator. The biasing member is moveable between a first compressed state and a second compressed state when the knife bank is in the engaged position.

In accordance with a further aspect, the present invention provides a counter knife bank assembly of a chopper assembly that includes a knife bank and a lever assembly. The knife bank is connected to a frame of the chopper assembly and moveable between an engaged position for operatively engaging a rotary chopper element of the chopper assembly and the retracted position for operatively disengaging from the rotary chopper element. The lever assembly is connected to the knife bank for moving the knife bank between engaged and retracted positions. The lever assembly includes an extendable member having a first end operatively connected to the knife bank for moving the knife bank between engaged and retracted positions, and a biasing member connected to the extension member for providing a biasing force on the knife bank. Further, when the extendable member is in the engaged position, the knife bank is movable between a first position and a second position. The biasing member moves between a first compressed state and a second compressed state when the knife bank is moved between first and second positions.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there are shown in the drawings an embodiment which is presently preferred. It should be understood, however, that the invention is not limited to the precise arrangements and instrumentalities shown.

In the drawings:

FIG. 5 is a side view of a knife bank attached to the lateral chopper concave frame of the counter knife bank assembly of FIG. 2;

FIG. 7 is a perspective view of an actuator of the lever assembly of FIG. 2;

FIG. 7A is a schematic block diagram of a control system in accordance with a preferred embodiment of the present invention;

FIG. 8 is a side view of an extension member of the lever assembly of FIG. 2;

FIG. 9 is a side view of a biasing member and an abutment member of the lever assembly of FIG. 2;

FIG. 10 is a perspective view of a spacer of the lever assembly of FIG. 2;

FIG. 11A is a bottom perspective view of an abutment member of the lever assembly of FIG. 2;

FIG. 11B is a top perspective view of the abutment member of FIG. 11A;

FIG. 12 is a perspective view of a stationary support member of the counter knife bank assembly of the present invention;

DETAILED DESCRIPTION OF THE INVENTION

Reference will now be made in detail to the preferred embodiments of the invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

Figure 1:
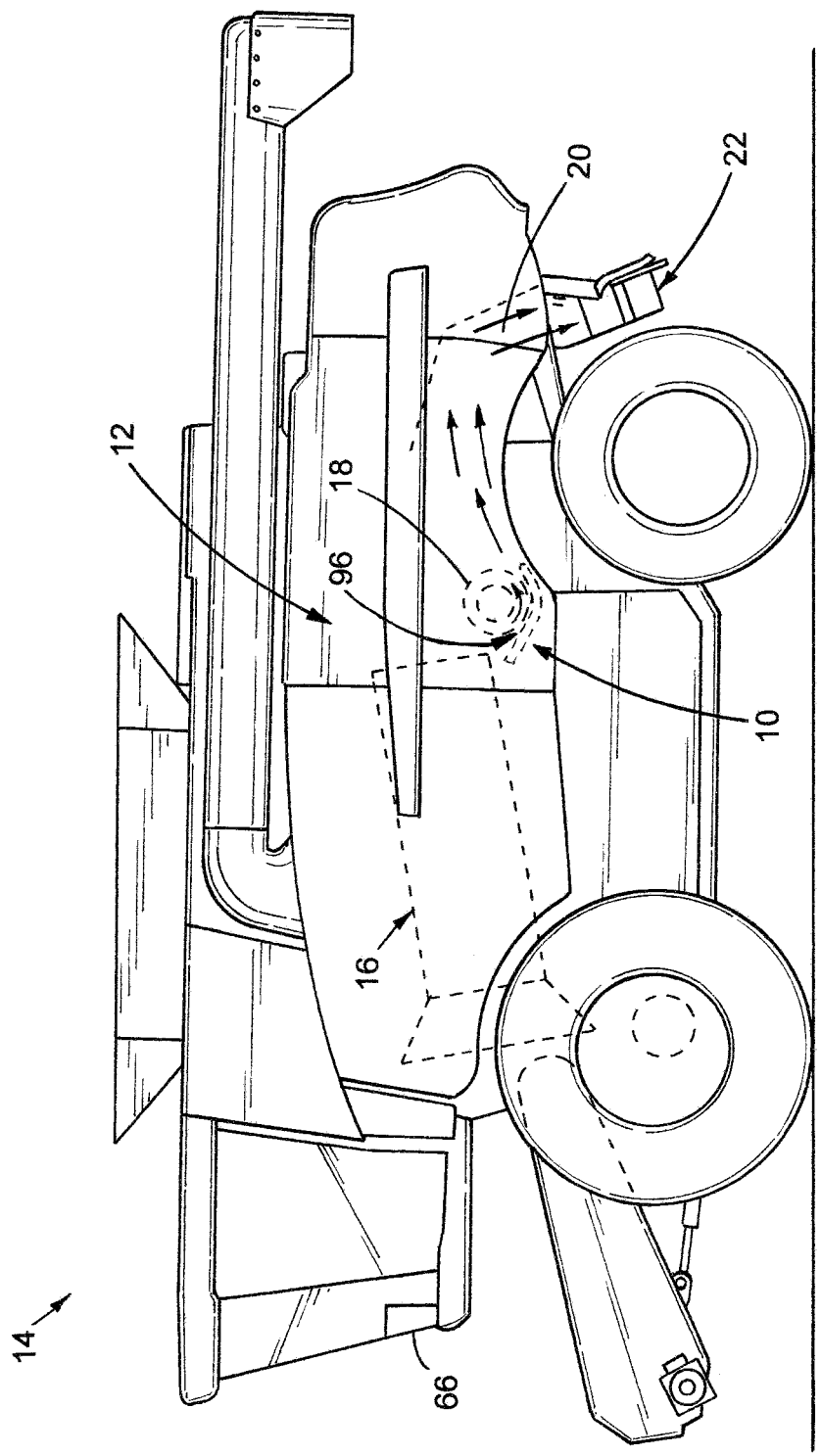
FIG. 1 is a side elevation view of an agricultural combine in accordance with a first preferred embodiment of the present invention.

Referring now to the drawings, wherein a preferred embodiment of the present invention is shown, FIG. 1 illustrates a counter knife bank assembly 10 of a chopper assembly 12 of the present invention as applied to an agricultural combine 14. The chopper assembly 12 includes a thresher 16, a counter knife bank assembly 10, a rotary chopper 18, an output passage 20 and a spreader 22. In particular, the counter knife bank assembly 10 is shown to be operatively connected to the rotary chopper 18 for receiving straw and other crop residue from the threshing mechanism 16 for cutting, chopping and propelling crop residue rearward through the output passage 20 and expelling the crop residue from the agricultural combine 14 via the spreader 22.

Referring to FIGS. 2-15B, the present invention provides a counter knife bank assembly 10 of a chopper assembly 12 that includes a knife bank 24 (FIG. 5) and a lever assembly 26 (FIG. 2) connected to the knife bank 24. The knife bank 24 is moveable between a first and second position relative to a stationary frame of the chopper assembly 12. The first position is an engaged position (FIG. 14A) for having the knife bank 24 operatively engaged with the rotary chopper 18. The second position is a retracted position (FIG. 14C) for having the knife bank 24 operatively disengaged from the rotary chopper 18. The counter knife bank assembly 10 also includes a lateral support 28 (FIG. 2) at one end and lateral support 28' (FIGS. 14A-14C) about an opposite end.

Figure 3:
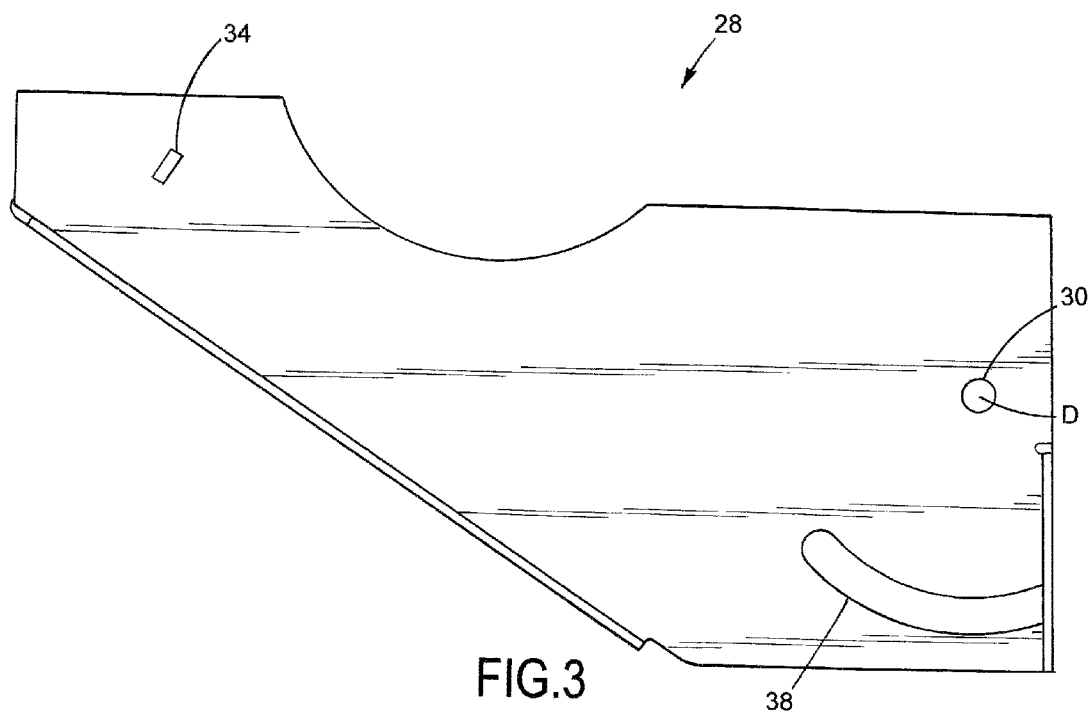
FIG. 3 is a side view of a lateral support of the counter knife bank assembly of FIG. 2.

The lateral support 28 is configured, as best shown in FIG. 3. The lateral support 28 is fixedly attached to the chopper assembly 12 via fasteners in a well known manner. The lateral support 28 includes an aperture 30 for pivotally attaching a lever 32 thereto, as further discussed below. The lateral support 28 also includes an aperture 34, preferably formed as an elongated aperture for supporting a stationary support member 36 that extends therefrom. Alternatively, the lateral support 28 can be formed to have the stationary support member 36 integrally formed therewith. About a bottom portion of the lateral support 28 and preferably located directly below aperture 30 is a curved aperture 38 that extends a fixed arc length. The curved aperture 38 follows a circumferential path formed by a radius extending from the aperture 30 to the curved aperture 38.

Figure 4:
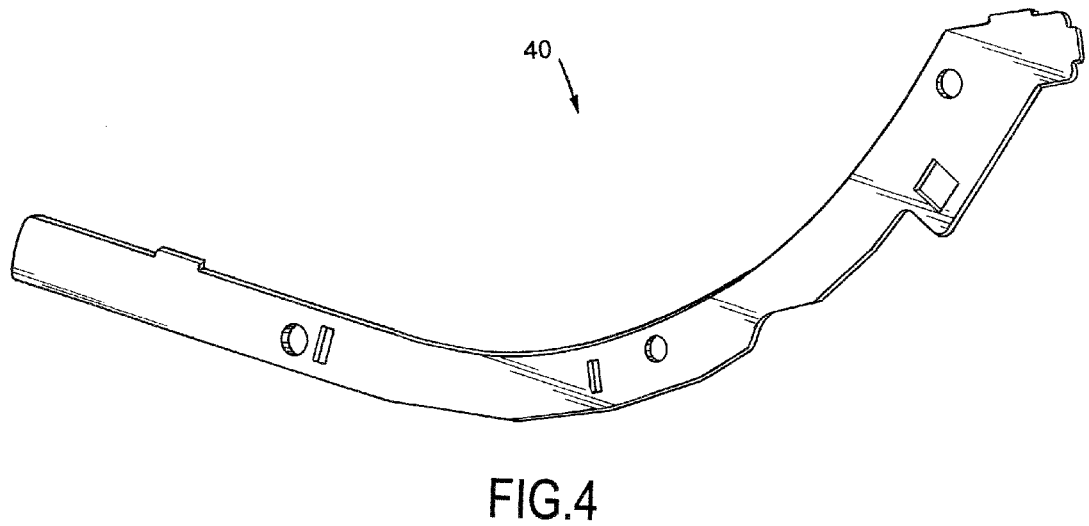
FIG. 4 is a perspective view of a lateral chopper concave frame that supports the counter knife bank assembly of FIG. 2.

The lateral chopper concave frame 40 is configured, as best shown in FIG. 4. The lateral chopper concave frame 40 is pivotally attached to the knife bank 24 (see FIG. 5) via lever 32 (FIGS. 14A-14C) and forms part of the overall frame used to support the knife bank 24 to the chopper assembly 12. Further details regarding the overall structure and operation of the lateral chopper concave frame 40 for the knife bank 24 is not necessary for a complete understanding of the present invention. However, exemplary knife banks applicable to the present invention are further disclosed in U.S. Pat. Nos. 8,141,805; 5,974,776; and 8,006,926, the entire disclosures of which are hereby incorporated by reference in their entirety.

Figure 6A:
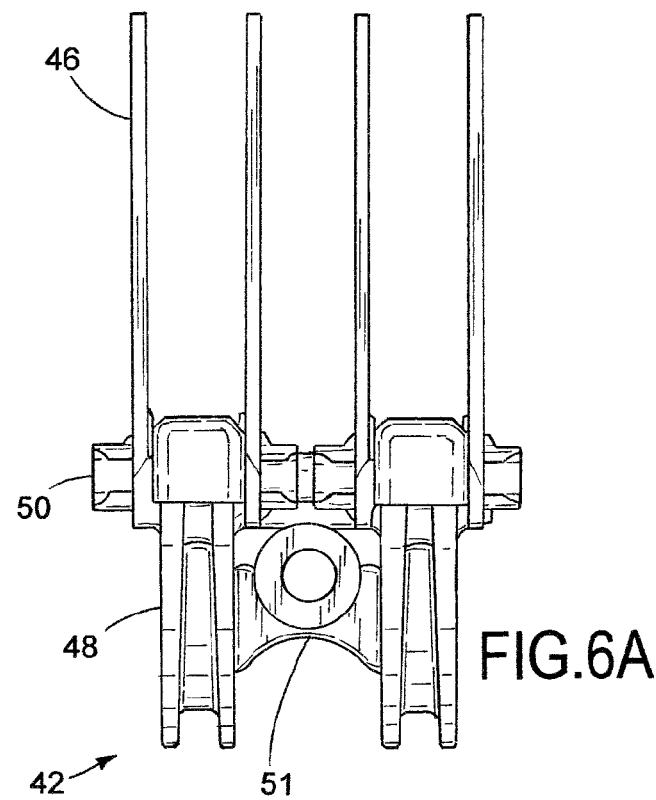
FIG. 6A is a front elevation view of a knife blade assembly of the counter knife bank assembly of FIG. 2.
Figure 6B:
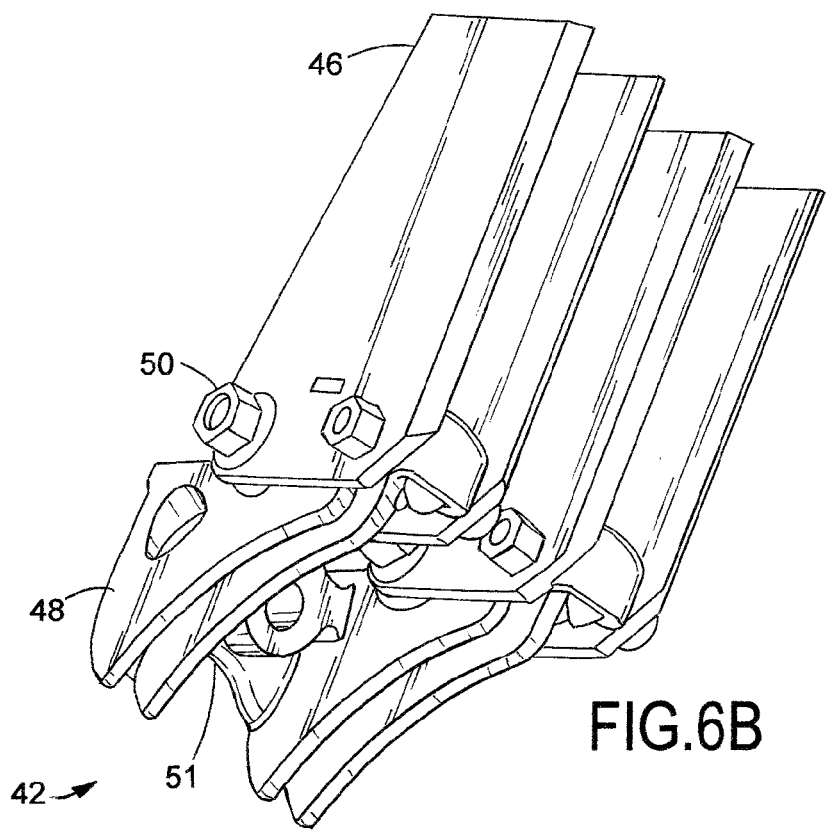
FIG. 6B is a perspective view of the knife blade assembly of FIG. 6A.

Referring to FIGS. 5, 6A and 6B, the knife bank 24 includes a plurality of knife blade assemblies 42 attached to a knife bank frame 44. Each knife blade assembly 42 includes a blade 46 connected to a bracket 48, e.g., by screws 50. The bracket 48 can be configured as an individual bracket or directly coupled to another bracket via a bridge 51 forming a dual bracket assembly, as shown. Each knife blade assembly 42 can have a plurality of blades 46 attached thereto. Preferably, as shown in FIG. 6A, each knife blade assembly 42 includes a pair of blades 46 connected to opposite lateral sides of the bracket 48. The plurality of knife blade assemblies 42 function as a singular knife bank 24 and each blade 46 moves in unison with every other blade 46 of the knife bank 24.

Referring back to FIGS. 2 and 5, the lever assembly 26 is connected to the knife bank 24 for moving the knife bank 24 between first and second positions. The lever assembly 26 is positioned about a lateral side of the knife bank 24 of the chopper assembly 12 for connection to the lateral support 28. The lever assembly 26 includes an extension member 52, a biasing member 54 and an abutment member 56. The extension member 52 has a first end (the end closest to the point of connection of the extension member 52 to the knife bank 24) operatively connected to the knife bank 24. Preferably, the biasing member 54 and abutment member 56 of the extension member 52 are aligned along a linear axis A. The extension member 52 includes an extension 58, but preferably includes an extension 58 and an actuator 60. In this configuration, the first end of the extension member 52 connected to the knife bank 24 is the most proximal end of the actuator 60.

The actuator 60 is configured, as best shown in FIG. 7. Such actuators are known in the art and a detailed description of their structure and operation is not necessary for a complete understanding of the present invention. For example, the actuator 60 can be a hydraulic or electric actuator or an extendable member suitable for the present invention. The actuator 60 has a distal end 60a and a proximal end 60b located opposite the distal end 60a. The distal end 60a being distal to the point of connection of the actuator 60 to the knife bank 24 compared to the proximal end 60b. The proximal end 60b of the actuator 60 has a connection member 62 configured for connecting the actuator 60 to the knife bank 24 via the lever 32, as further described below. Preferably, the connection member 62 is configured as a flange with a bolt hole connection.

Figure 2:
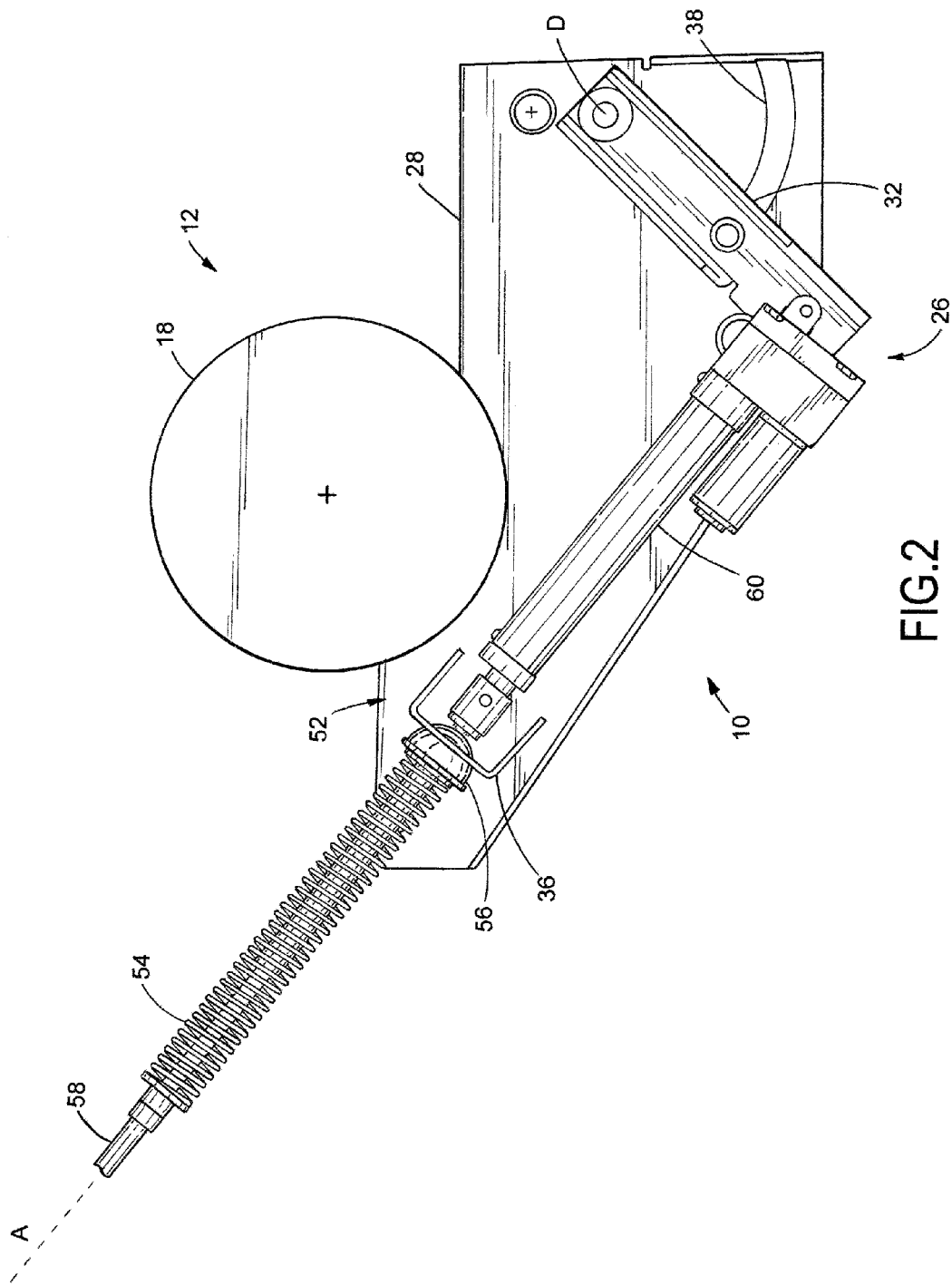
FIG. 2 is a side view of a lever assembly of a counter knife bank assembly in accordance with the first preferred embodiment of the present invention.

A piston 64 of the actuator 60 extends from the distal end 60a of the actuator 60 and is connected to the extension 58 (FIG. 2). The actuator 60 can be configured to move the extension 58 into a plurality of positions and controlled from a remote location, such as the cab of the vehicle or a wireless handheld device operated by a user outside of the vehicle to allow the user to make simple and efficient changes in knife bank 24 location depending on the requirements of the chopper assembly 12. Accordingly, the actuator 60 is operatively in communication with a controller 66 (FIG. 7A), such as an onboard controller 66 within the agricultural combine 14.

The extension 58 is configured preferably as a cylindrical rod, as best shown in FIG. 8. The extension 58 includes a distal end 58a and a proximal end 58b opposite the distal end 58a. The proximal end 58b is connected to the piston 64 of the actuator 60. Thus, the extension 58 moves in tandem with the piston 64 and relative to the stationary support member 36, as further described below.

Referring to FIG. 9, the biasing member 54 is connected to the extension member 52, preferably about the distal end 58a region of the extension 58. Preferably, the biasing member 54 is configured as a compression spring, but can alternatively be any biasing member suitable for the stated intended use. The biasing member 54 has a first end 54a and a second end 54b opposite the first end 54a. The first end 54a of the biasing member 54 is connected to an upper end portion or distal end 58a of the extension 58 and remains in a fixed position relative to the extension 58. The first end 54a is fixed in position about the distal end portion of the extension 58 by a stop 68. The stop 68 can be any stop suitable for the intended purpose of serving as a fixed stop position for the biasing member, but is preferably formed by a pair of locking nuts 70 and 72, and a washer 74. The locking nuts 70, 72 are connected to the extension 58 and fastened thereto in a fixed position. The washer 74 is placed below the locking nuts 70, 72 and abuts the locking nuts 70, 72 to serve as a surface about which the biasing member's first end 54a biases against at a fixed point on the extension 58.

The second end 54b of the biasing member 54 engages and biases against the abutment member 56, as further discussed below. The biasing member 54 is of sufficient size, length and spring constant so as to reach and provide a predetermined biasing force on the knife bank 24 about which the extension member 52 is connected to. The biasing member's first end 54a moves relative to the support member 36 while the biasing member's second end 54b remains stationary relative to the support member 36, including during an overload condition of the counter knife bank assembly 10. During normal movement of the counter knife bank assembly 10 by the actuator 60, the extension member 52, including the extension 58, remains stationary relative to the support member 36.

Referring to FIGS. 2, 9 and 10, the extension member 52 also includes a spacer 76. The spacer 76 is configured as a tubular spacer and is sized to receive the extension 58 therethrough, but is radially smaller than an internal radius of the biasing member 54 when configured as a compression spring. The spacer 76 is sized in a manner suitable to assist and optimize the biasing member 54 in providing a biasing force against the knife bank 24. In other words, the spacer 76 is positioned between the biasing member 54 and the extension 58, and circumscribes the extension 58.

The abutment member 56 is configured, as best shown in FIGS. 2, 11A and 11B. The abutment member 56 can be configured as any abutment member 56 suitable for the intended purpose of the present invention. However, the abutment member 56 is preferably configured as a substantially solid hemispherical dome shaped abutment member. The abutment member 56 has a planar surface 78 for engaging the biasing member 54. The abutment member 56 also includes a circumferential lip 80 extending from the planar surface 78. The abutment member 56 also includes an aperture 82 extending through a central axis B of the hemispherical dome shaped abutment member 56. The aperture 82 is configured to receive the extension 58 therethrough. Preferably, the aperture 82 is configured as a circular shaped aperture. However, the aperture 82 can be formed to have any other shape that can receive the extension 58. As further discussed below, the abutment member 56 is configured to bias against and articulate with the stationary support member 36.

The stationary support member 36 is configured, as best shown in FIGS. 2 and 12. The stationary support member 36 can be configured as any stationary support member 36 suitable for the intended purpose of the present invention. However, the stationary support member 36 is preferably configured as a planar support member having a substantially concave dome shaped center sized and configured to receive and articulate with the abutment member 56. As such, the abutment member 56 and stationary support member 36 form a ball and socket joint so as to allow the necessary articulation when the extension member 52 pivots between the first and second positions i.e., about axis D (FIG. 2).

The stationary support member 36 also includes an aperture 84 extending through a central axis C of the stationary support member 36. The aperture 84 is configured to receive the extension 58 therethrough. Preferably, the aperture 84 is configured as an elongated aperture such as an oval shaped aperture. However, the aperture 84 can be formed to have any other shape that can receive the extension 58 and allow for additional play of the extension 58 therein, such as an oversized circular aperture, a square aperture, an octagonal aperture, a rectangular aperture, or any other applicable polygon shape. The stationary support member 36 is rigidly connected to the lateral support 28 of the chopper assembly 12 via an abutment 86, which is received within aperture 34, for maintaining the stationary support member 36 in a fixed position. Alternatively, the stationary support member 36 can be integrally formed or welded to the lateral support 28.

Figure 13:
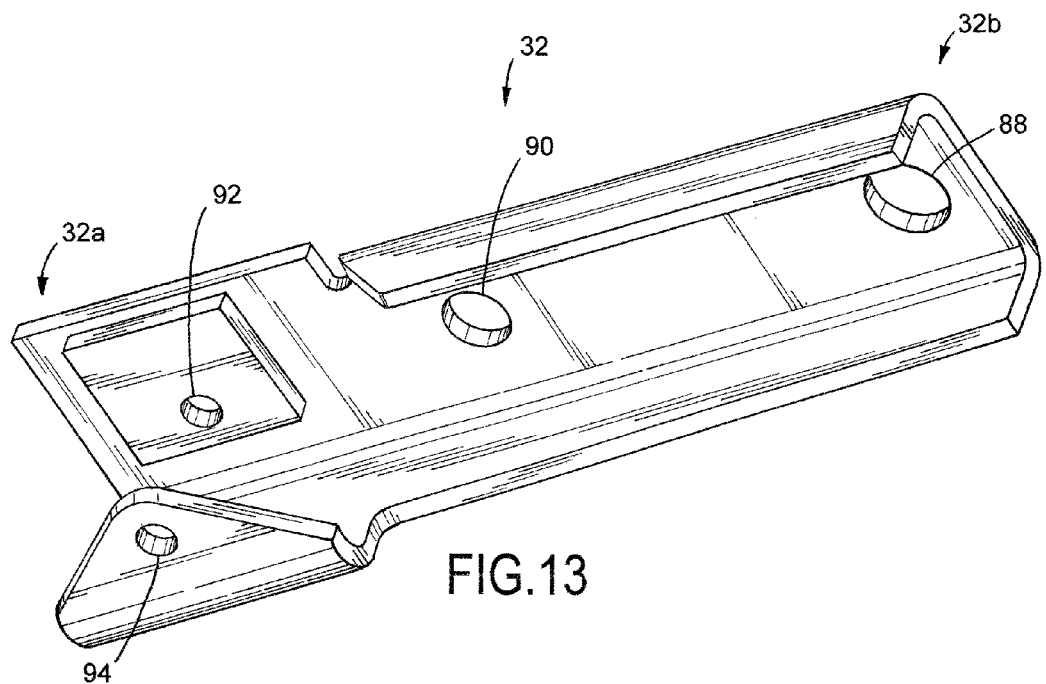
FIG. 13 is a perspective view of a lever of the counter knife bank assembly of FIG. 2.

The lever 32 is configured, as best shown in FIGS. 2 and 13. The lever 32 includes a distal end 32a and a proximal end 32b opposite the distal end 32a. The lever 32 is pivotally connected to the lateral support 28 so as to pivot about axis D.

The lever 32 includes a thru-hole 88 about its proximal end 32b to allow for pivotal connection of the lever 32 to the lateral support 28. About a mid portion of the lever 32 is a thru-hole 90 for connection and engagement with an extension extending from the knife bank 24 and/or through the curved aperture 38 on the lateral support 28, or a fastener for attaching the lever 32 to the knife bank 24. For example, a screw with an appropriate washer (not shown) can be fed through the thru-hole 90 for connecting the lever to the knife bank 24. About a distal end 32a of the lever 32 are a pair of distal apertures 92, 94. The connection member 62 of the actuator 60 slidingly engages the slot between the distal apertures 92, 94. The apertures 92, 94 provide a bore hole for fastening the actuator 60 via the connection member 62 thereto e.g., by a fastener, such as a bolt and screw.

In operation, the counter knife bank assembly 24 of the chopper assembly 12 provides a means to automatically allow for the passage of foreign objects that may damage blades 46 of the knife bank 24 through the chopper assembly 12 without operator intervention. The counter knife bank assembly 10 also provides a means to automatically reengage the knife bank 24 to the engaged position after allowing for the passage of a foreign object through the chopper assembly 12 without operator intervention.

Figure 14A:
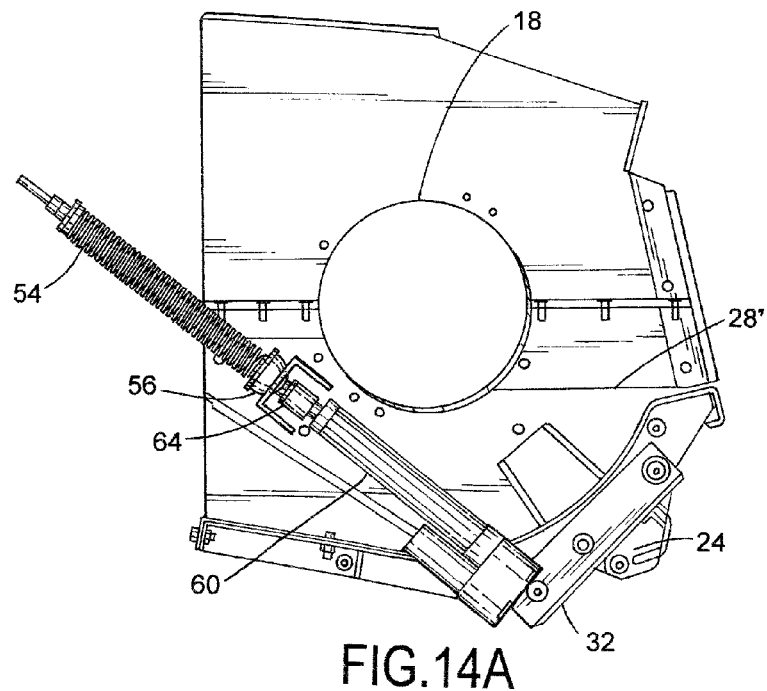
FIG. 14A is a side view of the counter knife bank assembly of FIG. 2 in a fully engaged position.
Figure 14B:
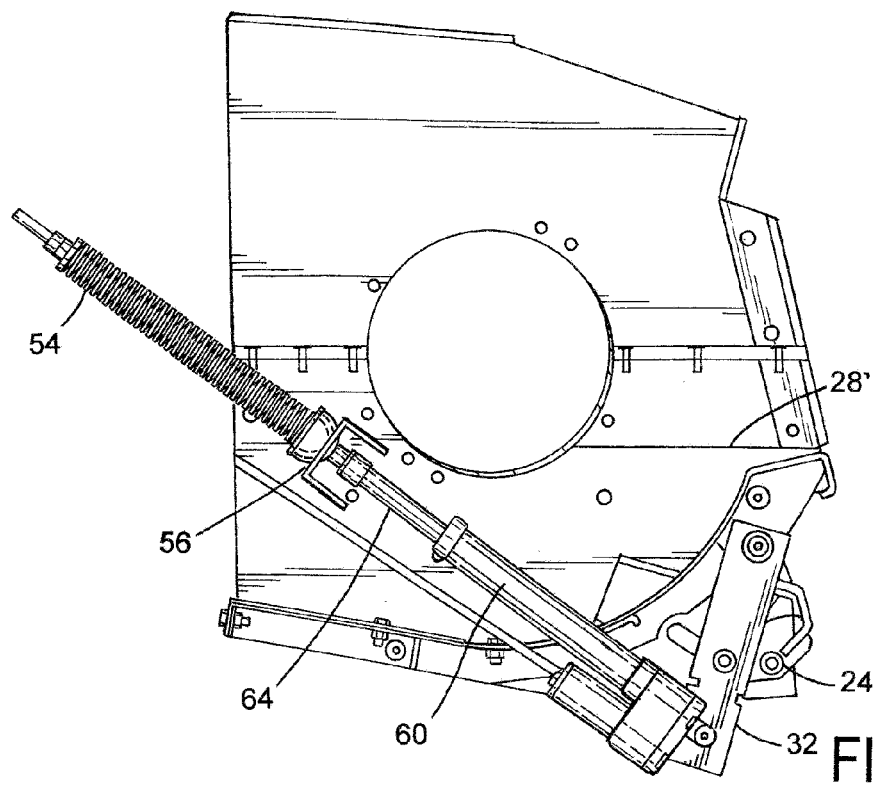
FIG. 14B is a side view of the counter knife bank assembly of FIG. 2 in a partial or half engaged position.
Figure 14C:
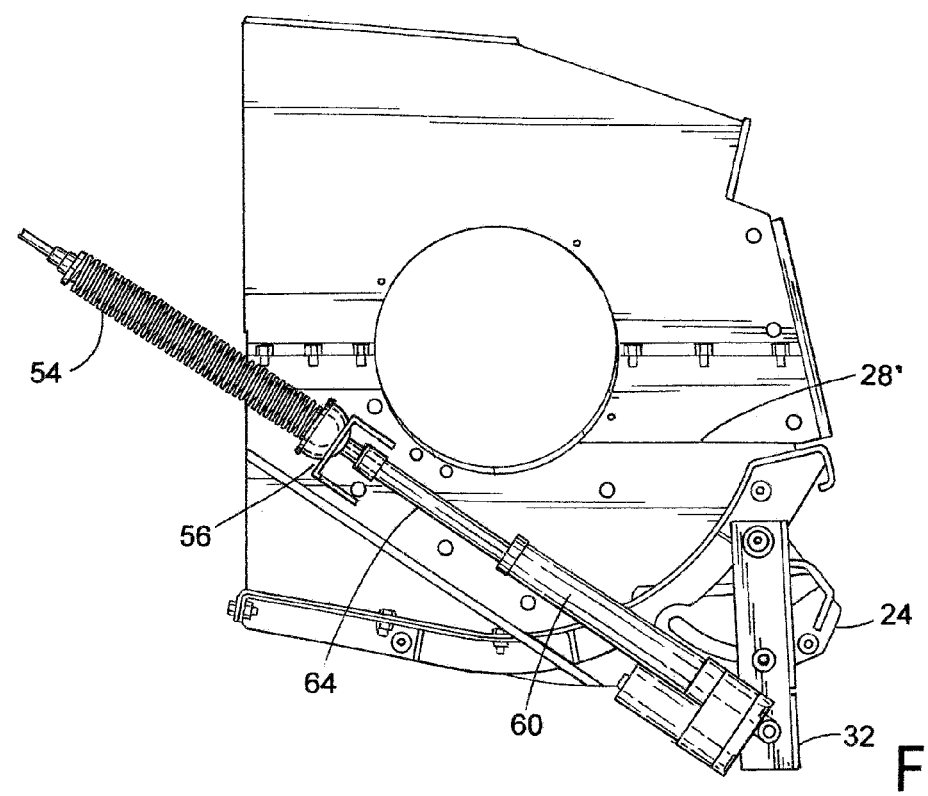
FIG. 14C is a side view of the counter knife bank assembly of FIG. 2 in a fully retracted position.

As shown in FIGS. 14A, 14B and 14C, the actuator 60 moves the knife bank 24 between a plurality of positions. The knife bank 24 can be positioned in a fully engaged position, as shown in FIG. 14A, where the knife bank 24 is operatively engaged with the rotary chopper 18 so as to cut and chop agricultural product that passes along a passageway 96 (FIG. 1) of the chopper assembly 12. The passageway 96 is formed by the space between the rotary chopper 18 and the knife bank 24 where harvested crop material passes through. The knife bank 24 can also be positioned in a fully retracted position, as shown in FIG. 14C, where the knife bank 24 vacates the passageway 96 so as to operatively disengage the knife bank 24 from the rotary chopper 18 thereby allowing for the passage of agricultural product and any other obstructions to pass through the passageway 96 without hindrance from the knife bank 24. The actuator 60 of the counter knife bank assembly can also move the knife bank 24 to a plurality of positions between fully engaged and fully retracted (see e.g., FIG. 14B) so as to allow for different cutting attributes to be applied to the agricultural product as it passes along the chopper assembly 12 and around the rotary chopper 18.

Referring to FIG. 14A, the biasing member 54 provides a predetermined biasing force on both the knife bank 24 and the actuator 60 to maintain the knife bank 24 in the fully engaged position when the actuator 60 is set in the fully engaged position. However, when the knife bank 24 encounters a foreign object, such as a rock, which overloads or creates excessive pressure on the knife bank 24, the force of the foreign object moves knife bank 24 to the retracted position (FIG. 15A) owing to the compressibility of the biasing member 54. Thus, with the knife bank 24 in the fully engaged position, the force of the obstruction moves the knife bank 24 to the fully or a partially retracted position necessary to allow the obstruction to pass through the passage 96.

Figure 15A:
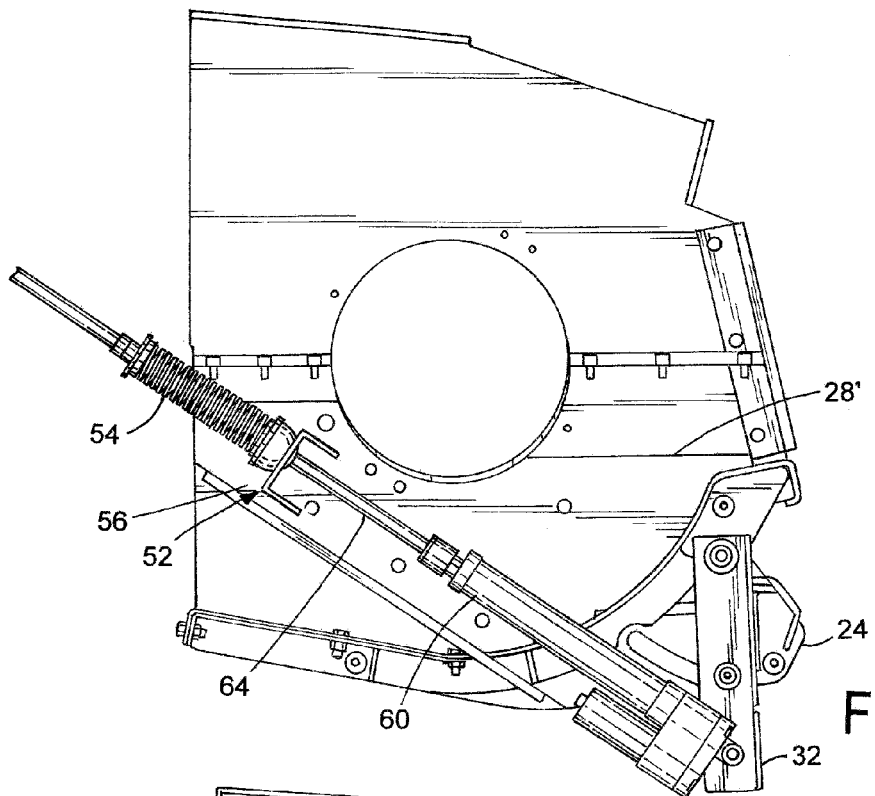
FIG. 15A is a side view of the fully engaged counter knife bank assembly of FIG. 14A in a fully retracted position due to an obstruction.
Figure 15B:
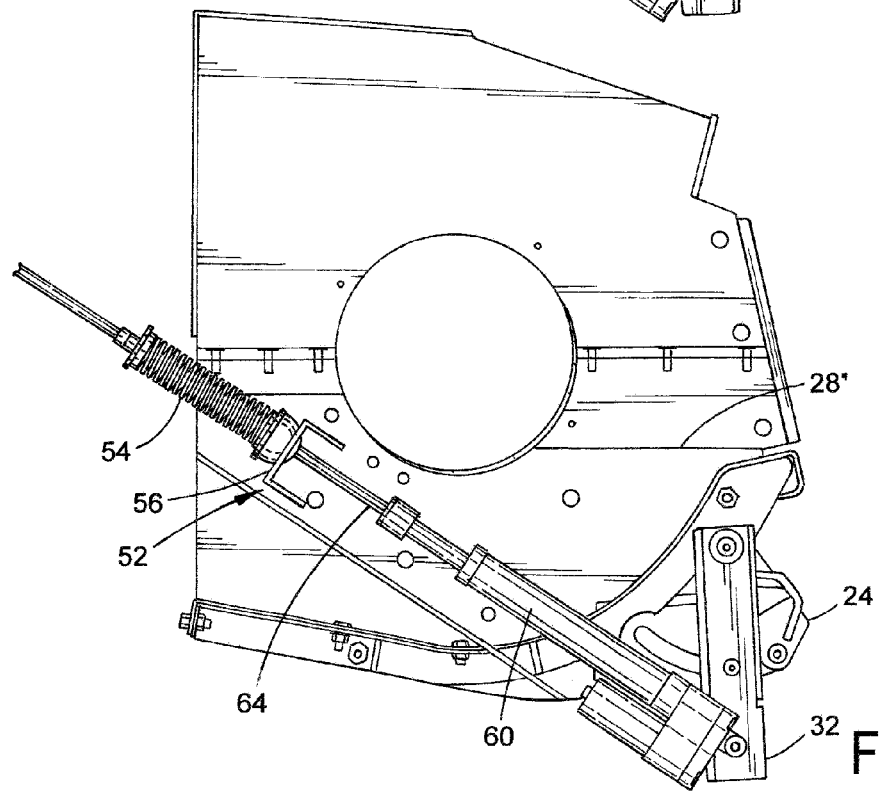
FIG. 15B is a side view of the partial or half engaged counter knife bank assembly of FIG. 14B in a fully retracted position due to an obstruction.

In other words, the entire extension member 52 moves to a retracted position and in doing so, compresses the biasing member 54 (FIG. 15A) from a first compressed state (e.g., FIG. 14A) to a second compressed state (e.g., FIG. 15A). Then, when the obstruction has passed, the force of the compressed biasing member 54 automatically and passively moves the knife bank 24 back to the originally fully engaged position (FIG. 14A). FIG. 15B represents a retracted position of the knife bank 24 for the passage of an obstruction when the knife bank 24 is originally set in a partially engaged position, as shown in FIG. 14B. In both FIGS. 15A and 15B, the position of the actuator 60 i.e., the length of extension of the piston 64, does not change, instead the knife bank 24 moves to the retracted position owing to the compressibility of the biasing member 54 and movement of the extension 58 relative to the stationary support member 36. That is, the biasing member 54 is movable between a first compressed state and a second compressed state when the knife bank 24 is in the engaged position.

The predetermined biasing force is provided by the biasing member 54 biasing against the stationary support member 36. The biasing force is sufficient to maintain the knife bank 24 in a fully or partially engaged position during normal operations, but less than a force generated by a hardened foreign object that can damage the blades of the knife bank 24.

The foregoing counter knife bank assembly 10 of the present invention advantageously provides for an automatic and passive means to allow foreign hard objects to pass through a chopper assembly 12 of an agricultural combine 14 without damaging the combine's knife bank 24. The counter knife bank assembly 10 also eliminates the need for manual intervention to clear obstructions passing through a chopper assembly, thereby allowing for more efficient harvesting of crop materials.

It will be appreciated by those skilled in the art that changes could be made to the embodiments described above without departing from the broad inventive concept thereof. For example, additional components can be added to the counter knife bank assembly. It is to be understood, therefore, that this invention is not limited to the particular embodiment disclosed, but it is intended to cover modifications within the spirit and scope of the present invention as defined by the appended claims.

We claim:

1. A counter knife bank assembly of a chopper assembly comprising:
   a knife bank connected to a frame of the chopper assembly and moveable between a first position and a second position relative to the frame;
   a lever assembly connected to the knife bank for a movement of the knife bank between the first position and the second position, the lever assembly including:
      an extension member having a first end operatively connected to the knife bank,
      a biasing member connected to the extension member, and
      an abutment member engaged with the biasing member and biased against a stationary support member of the chopper assembly for articulation therewith; wherein the abutment member includes a concave hemispherical dome to form a ball and socket joint with the extension member, for a linear axis alignment with the biasing member.

2. The counter knife bank assembly of claim 1, wherein the biasing member provides a biasing force on the knife bank.

3. The counter knife bank assembly of claim 1, wherein the extension member includes:
   the actuator having a first end operatively connected to the knife bank and a second end opposite the first end; and
   an extension connected to and extending from the second end of the actuator.

4. The counter knife bank assembly of claim 1, wherein the extension member includes:
   an actuator having a first end operatively connected to the knife bank and a second end opposite the first end, and wherein the actuator is configured to move the knife bank between an engaged position for operatively engaging a rotary chopper element of the chopper assembly and a retracted position for operatively disengaging from the rotary chopper element; and
   wherein the biasing member moves between a first compressed state and a second compressed state when the knife bank moves between the first position and the second position.

5. The counter knife bank assembly of claim 1, wherein the first position is an engaged position for operatively engaging a rotary chopper element of the chopper assembly and the second position is a retracted position for operatively disengaging from the rotary chopper element.

6. The counter knife bank assembly of claim 1, wherein the biasing member has a second end proximate the knife bank, and a first end opposite the second end and distal to the knife bank, wherein the first end of the biasing member is fixed in position relative to the extension member.

7. The counter knife bank assembly of claim 6, wherein the second end of the biasing member is configured to move relative to the extension member.

8. The counter knife bank assembly of claim 1, wherein the extension member moves relative to the stationary support member.

9. The counter knife bank assembly of claim 1, wherein extension member passes through the stationary support member.

10. The counter knife bank assembly of claim 1, wherein the stationary support member is configured as a concave support member having an aperture for receiving the extension member.

11. The counter knife bank assembly of claim 1, wherein the abutment member is a hemispherical dome having an aperture for receiving the extension member.

12. The counter knife bank assembly of claim 1, wherein the extension member is a rod and the biasing member is a compression spring that circumscribes the rod.

13. The counter knife bank assembly of claim 1, wherein the lever assembly further includes a spacer positioned between the biasing member and the extension member.

14. The counter knife bank assembly of claim 13, wherein the spacer circumscribes the extension member.

15. The counter knife bank assembly of claim 1, wherein the lever assembly is positioned about a lateral side of the knife bank.

16. The counter knife bank assembly of claim 1, wherein the lever assembly is moveable between a plurality of positions.

17. A chopper assembly for an agricultural combine comprising:
   a rotary chopper element; and
   a counter knife bank assembly spaced from the rotary chopper element to form a passageway therethrough, the counter knife bank assembly including:
      a knife bank connected to a frame of the chopper assembly and moveable between an engaged position and a retracted position relative to the rotary chopper element, and
      a lever assembly connected to the knife bank for moving the knife bank between the engaged and retracted positions, the lever assembly including:
         an actuator having a proximal end connected to the knife bank and a distal end opposite the proximal end,
         an extension extending from the distal end of the actuator, and
         a biasing member having a first end and a second end opposite the first end, wherein the first end is fixedly attached to the extension and the biasing member provides a biasing force on the knife bank and the actuator, and
         wherein the biasing member is moveable between a first compressed state and a second compressed state when the knife bank is in the engaged position;
         an abutment member engaged with the biasing member and biased against a stationary support member of the chopper assembly; and
         a hemispherical member as part the abutment member to form a ball and socket joint with the extension, for a linear axis alignment with the biasing member.

18. The chopper assembly of claim 17, wherein the counter knife bank assembly further includes a stationary support member that includes an aperture for receiving the extension therethrough.

19. The chopper assembly of claim 18, wherein the second end of the biasing member engages the stationary support member.

20. The chopper assembly of claim 18, wherein the lever assembly further includes an abutment member biased by the biasing member and articulates with the stationary support member.

21. A counter knife bank assembly of a chopper assembly comprising:
   a knife bank connected to a frame of the chopper assembly and moveable between an engaged position for operatively engaging a rotary chopper element of the chopper assembly and a retracted position for operatively disengaging from the rotary chopper element; and
   a lever assembly connected to the knife bank for moving the knife bank between the engaged and retracted positions, the lever assembly including:
      an extendable member having a first end operatively connected to the knife bank for moving the knife bank between the engaged position and the retracted position, and
      a biasing member connected to the extension member for providing a biasing force on the knife bank,
      wherein when the extendable member is in the engaged position, the knife bank is movable between a first position and a second position;
      an abutment member engaged with the biasing member and biased against a stationary support member of the chopper assembly; and
      the abutment member having a hemispherical dome to form a ball and socket joint with the extension member, for a linear axis alignment with the biasing member.

22. The counter knife bank assembly of claim 21, wherein the biasing member moves between a first compressed state and a second compressed state when the knife bank is moved between first and second positions.

* * * * *